US008798911B2

(12) United States Patent
Smith

(10) Patent No.: US 8,798,911 B2
(45) Date of Patent: Aug. 5, 2014

(54) SYSTEMS AND METHODS FOR DETERMINING BEARING

(75) Inventor: Mark Dean Smith, Glendale, AZ (US)

(73) Assignee: L-3 Communications Corporation, New York, NY (US)

( * ) Notice: Subject to any disclaimer, the term of this patent is extended or adjusted under 35 U.S.C. 154(b) by 3233 days.

(21) Appl. No.: 10/889,983

(22) Filed: Jul. 12, 2004

(65) Prior Publication Data

US 2006/0009909 A1 Jan. 12, 2006

(51) Int. Cl.
*G06G 7/78* (2006.01)

(52) U.S. Cl.
USPC .......................................... 701/408; 342/29

(58) Field of Classification Search
USPC ........ 701/301, 3, 10, 300, 213, 214; 340/961;
342/29, 454, 357.06, 35.087, 30, 32,
342/36, 350, 385, 386
See application file for complete search history.

(56) References Cited

U.S. PATENT DOCUMENTS

| | | | |
|---|---|---|---|
| 3,864,681 A | 2/1975 | Olive | |
| 5,191,349 A | 3/1993 | Dinsmore et al. | |
| 5,387,915 A | 2/1995 | Moussa et al. | |
| 5,477,225 A | 12/1995 | Young et al. | |
| 5,604,504 A * | 2/1997 | Nail | 342/417 |
| 5,905,463 A | 5/1999 | Hannan | |
| 6,281,841 B1 | 8/2001 | Nevill | |
| 6,297,765 B1 | 10/2001 | Frazier et al. | |
| 6,329,947 B2 | 12/2001 | Smith | |
| 6,657,578 B2 * | 12/2003 | Stayton et al. | 342/30 |
| 6,690,296 B2 | 2/2004 | Corwin et al. | |
| 7,006,032 B2 * | 2/2006 | King et al. | 342/29 |
| 7,054,739 B2 * | 5/2006 | Taylor | 701/200 |
| 2001/0040526 A1 | 11/2001 | Smith | |
| 2002/0188398 A1 * | 12/2002 | Watson | 701/120 |
| 2003/0137403 A1 * | 7/2003 | Carrender et al. | 340/10.4 |
| 2005/0024256 A1 * | 2/2005 | Ridderheim et al. | 342/29 |
| 2005/0156777 A1 * | 7/2005 | King et al. | 342/29 |
| 2009/0135309 A1 * | 5/2009 | DeGeorge et al. | 348/732 |

FOREIGN PATENT DOCUMENTS

EP 1 389 735 A1 2/2004

OTHER PUBLICATIONS

Bernays D.J. et al., "Validation Techniques for ADS-B Surveillance Data," 21st DASC, Irvine, CA, Oct. 27-31, 2002, Digital Avionics Systems Conference, New York, NY, vol. 1 of 2. Conf. 21, Oct. 27, 2002, pp. 3E2-1-3E2-9.

* cited by examiner

*Primary Examiner* — Khoi Tran
(74) *Attorney, Agent, or Firm* — Allen J. Moss; Squire Patton Boggs (US) LLP

(57) ABSTRACT

A system determines bearing for situational awareness. The system may include a receiver, a processor, and a memory comprising an engine for performing a method. The method includes receiving signals using directional reception; receiving positional data; calculating a correction amount; and applying the correction amount to subsequent uncorrected bearings to provide corrected bearings. Positional data may be received in any conventional format including data link, ADS-B, and MODE S. Positional data may be determined in the target using a global positioning system. The system may provide a signal to display the corrected bearing and/or provide traffic alerting and collision avoidance advisories.

28 Claims, 3 Drawing Sheets

SYSTEMS AND METHODS FOR DETERMINING BEARING

FIELD OF THE INVENTION

Embodiments of the present invention relate to determining bearing for situational awareness.

BACKGROUND OF THE INVENTION

Situational awareness for the pilot of a vehicle includes timely knowledge of other vehicles and obstacles for safe operation of the vehicle. For example, aircraft pilots require situational awareness for safe navigation. Air traffic controllers also require situational awareness for accurate analysis of traffic conditions.

From the point of view of an aircraft pilot, as technology in air transportation is evolving and air traffic is dramatically increasing, the demands on the members of the flight deck are also increasing. To avoid flight path conflicts, the flight deck crew monitors considerable aircraft status information for multiple surrounding aircraft. Higher aircraft speeds magnify the burden by reducing the time in which the flight deck crew can respond to threatening situations. To assist the flight deck crew and enhance safety, several systems have been developed. One such system is based on transponders (e.g., MODE S, MODE C, MODE A), each hosted on a respective aircraft, that each report host aircraft identity and may report host aircraft altitude and other flight parameters. Typically, a transponder aboard a host aircraft replies to interrogations from other aircraft or ground based systems. A conventional collision avoidance system receives signals sent by transponders and uses these signals to identify the position of other aircraft. Results are provided as displayed data and possibly traffic advisories. Potential collision situations are identified. Resolution advisories may be provided suggesting an action to avoid the collision situation.

An aircraft collision avoidance system typically includes a directional antenna. The collision avoidance system uses signals from the directional antenna to determine the bearing from the host aircraft to a target (e.g., another aircraft). Bearing is displayed to the flight deck crew to assist them in obtaining visual contact with the target.

Aircraft collision avoidance systems may determine the bearing to a target by comparing magnitudes of signals received from a directional antenna of the type disclosed in U.S. Pat. No. 5,191,349 to Dinsmore, hereby incorporated by reference. Systems using this approach are generally referred to as amplitude monopulse systems and may be of the type disclosed in U.S. Pat. No. 6,329,947 to Smith, hereby incorporated by reference.

FIG. 1 illustrates the radiation pattern of a conventional directional antenna of the type used in an amplitude monopulse system. The antenna has four elements. The signals illustrated were measured on a four foot diameter flat ground plane. This radiation pattern is desired for performance of the antenna on all aircraft. As shown, the performance of the antenna in each of the four quadrants representing aft 100, port 110, fore 120, and starboard 130 is virtually identical. To determine the bearing of a target, a conventional collision avoidance system may use a model based on the radiation pattern of FIG. 1. When a target is detected, the bearing of the target is calculated by determining which beam 100, 110, 120, or 130 has the largest amplitude, determining which beam has the second largest amplitude, and taking the difference between the two. Based on this difference and the model, a bearing is determined.

Other conventional collision avoidance systems determine bearing to a target by determining and processing the phase angle of signals received at various elements of a directional antenna. Systems using this approach are generally referred to as phase monopulse systems.

Various factors, however, may degrade the accuracy of bearing determinations. For example, a collision avoidance system hosted on an aircraft having a fuselage with a relatively small radius of curvature may determine less accurate bearing because the ground plane assumed in the model differs from the surface of the fuselage. The degradation in accuracy tends to be more pronounced in an aircraft with a smaller fuselage than in an aircraft with a larger fuselage. The magnitude of the error differs: (a) with the elevation angle of the target; (b) with equipment (e.g., manufacturing variations from model conditions); and (c) with installation (e.g., reflections from adjacent antennas, wings, engines, and other aircraft obstructions).

In the patent to Smith a solution is presented to correct bearing errors solely related to effects due to fuselage curvature. These errors are predictable on the basis of fuselage design. Corrections may be generally applied to all aircraft having similar fuselage curvature. The techniques disclosed by Smith are difficult to apply for errors from other sources discussed above. Smith teaches manually setting a bearing indicator based on aircraft curvature. This technique leads to errors in determined bearing when a wrong value is set. A predefined value may be inappropriate in important cases. Smith uses fixed correction models that may no longer apply after future changes to an installation.

Without systems and methods of the present invention, further reduction of bearing errors cannot be obtained. Consequently, advisories and displays for systems such as a conventional traffic alert and collision avoidance system may be considered unreliable or lead to tragic loss of life and property.

SUMMARY OF THE INVENTION

A system determines bearing for situational awareness. The system may include a receiver, a processor, and a memory comprising an engine for performing a method. The method includes receiving signals using directional reception; receiving positional data; calculating a correction amount; and applying the correction amount to subsequent uncorrected bearings to provide corrected bearings. Positional data may be received in any conventional format including data link, ADS-B, and MODE S. Positional data may be determined in the target using a global positioning system. The system may provide a signal to display the corrected bearing and/or provide traffic alerting and collision avoidance advisories.

By determining corrected bearing in part in accordance with a stored correction amount, the system may exhibit adaptive behavior, for example, to accommodate for changes in the environment surrounding the antenna, and changes in equipment.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. The present invention is not intended to be limited to the embodiments shown, but is to be accorded the widest scope consistent with the principles, features, and teachings disclosed herein.

Vehicular pilots receive information for situational awareness from annunciators (e.g., displays, speakers) and other crew members. Automated control systems receive information for situational awareness from instruments and processors. Situational awareness generally includes knowledge of the location of the host vehicle (e.g., an aircraft in which the pilot, crew members, automated flight controls, and systems for situational awareness are present) and targets (e.g., ground features, structures, other aircraft on the ground or in the air). Generally, situational awareness helps a pilot (or other system) to guide the host vehicle. Various aspects of the present invention may be implemented for host and/or other vehicles to provide situational awareness to humans and/or to systems that automatically operate the vehicle's controls. Vehicle controls may include controls for guiding the host or other vehicles and/or operating any auxiliary equipment whether located with the host vehicle, a target vehicle, or surrounding environment. Situational awareness also helps a traffic controller (e.g., air traffic control system operator, automatic traffic control system) assess traffic and may help navigation, guidance, relieve congestion, and/or traffic conflict resolution. Systems according to various aspects of the present invention may be distributed among vehicles (e.g., formation members) and/or auxiliary equipment (e.g., ground based portions) using conventional processing and communication technologies. For clarity, in the example implementation discussed below, system functions are generally provided in a host for improved situational awareness of a pilot of the host.

Figure 2:
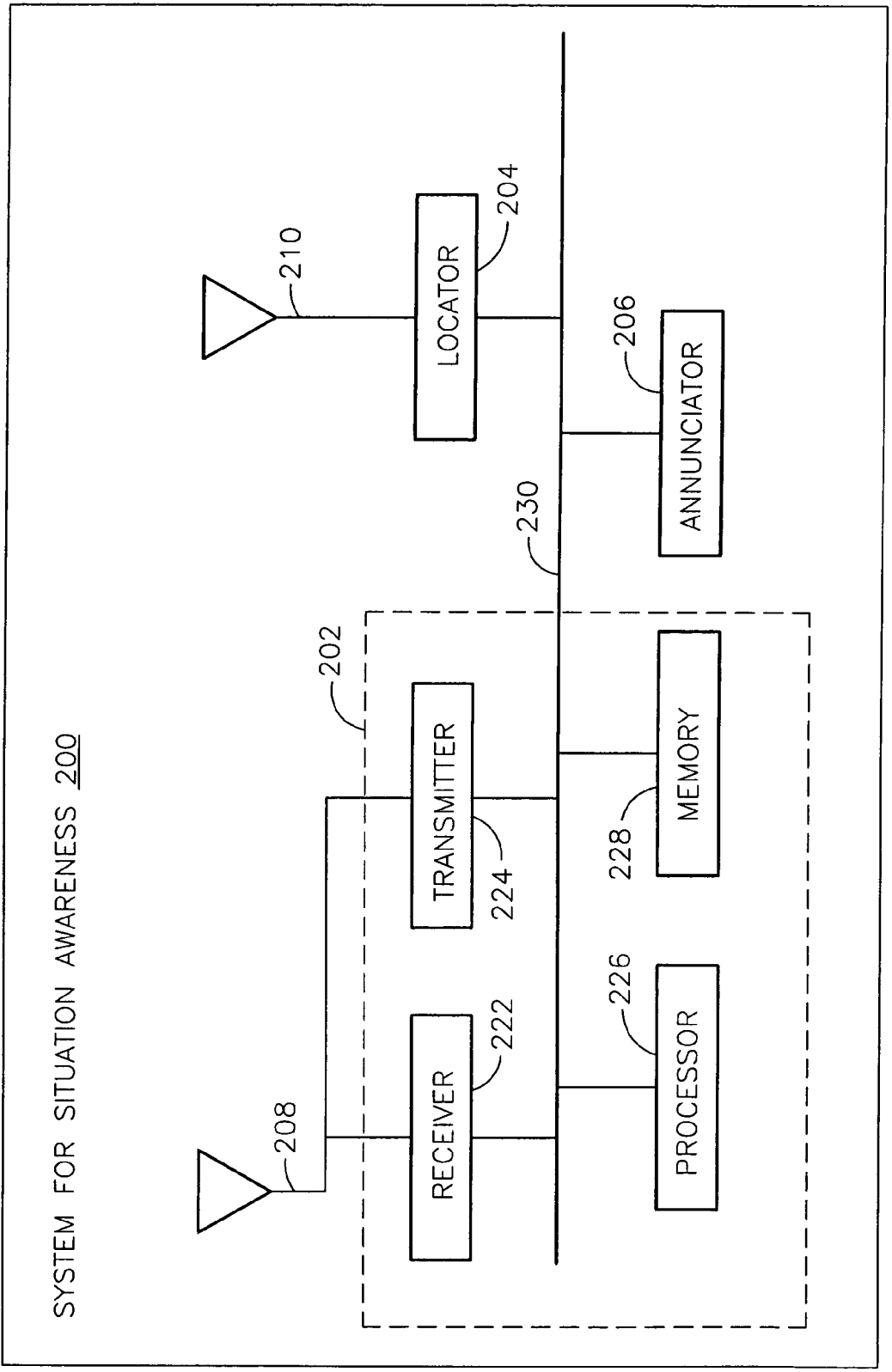
FIG. 2 is a functional block diagram of a system for situational awareness according to various aspects of the present invention.

A system for situational awareness may provide audible and/or visual advisories to an aircraft pilot for collision avoidance. An important component of situational awareness is bearing from a host to a target. For example, bearing tells a pilot where to look for visual acquisition of the target. Bearing (uncorrected or corrected) generally may be an angular measurement in a plane (e.g., azimuth). For example, system 200 of FIG. 2, installed on a host aircraft, includes a collision avoidance system 202, a locator 204, an annunciator 206, and antennas 208 and 210. Coupling between system components may be implemented in any conventional manner (e.g., one or more buses, one or more standard interfaces).

In other implementations, system 200 may include additional devices (not shown) to assist in providing situational awareness using corrections of the type discussed above, such as, one or more network connections (data links) to equipment on the host, the ground, or other aircraft (e.g., formation members) (e.g., a LAN, intranet, or the Internet), one or more input/output interfaces for peripherals (e.g., a user interface, printer, data loader, equipment for configuration control, or an archiving device for logged results of processing). The structure and function of data links may be of the type described in U.S. Pat. No. 6,657,578 to Stayton, incorporated herein by reference.

A collision avoidance system provides advisories to a pilot and/or signals to other systems and/or to controls so that the host may safely avoid a collision with a target. Such a system may include the functions of a conventional traffic alert and collision avoidance system (TCAS) such as an amplitude monopulse collision avoidance system or a phase monopulse collision avoidance system as discussed above. For example, collision avoidance system 202 provides conventional collision avoidance system features such as traffic information and commands to resolve a predicted traffic conflict.

A locator determines the position of the host. Any conventional locator may be used. In various implementations, locator 204 includes a global positioning system (GPS) for determining position using GPS satellites, a subsystem cooperative with GLONASS satellites, a subsystem cooperative with the well known LORAN system, and/or an inertial navigation system. Collision avoidance system 202 cooperates with locator 204 to receive updated host location information.

An annunciator provides information to a flight crew member in audio and/or visual format. For example, annunciator 206 presents, among other things, bearing to each of several targets, as determined by collision avoidance system 202. Annunciator 206 may include any conventional display (e.g., a VSI/TRA display). Collision avoidance system 202 provides suitable signals to annunciator 206 for the display of bearing. Annunciator 206 may also issue traffic advisories and/or resolution advisories as directed by collision avoidance system 202.

Generally, a collision avoidance system determines bearing from the host to a target and uses bearing to provide advisories and signals as discussed above. For example, system 202 includes receiver 222, transmitter 224, processor 226, and memory 228 coupled for data communication by bus 230. In another implementation, transmitter 224 is omitted or temporarily disabled (e.g., for reducing radio interference) and bearing is determined without transmitting. System 202 may be packaged to include locator 204 and/or annunciator 206 within the same housing (e.g., LRU).

A processor includes any circuit that performs a method that may be recalled from memory and/or performed by logic circuitry. The circuit may include conventional logic circuit(s), controller(s), microprocessor(s), and state machine(s) in any combination. The method may be implemented in circuitry, firmware, and/or software. Any conventional circuitry may be used (e.g., multiple redundant microprocessors, application specific integrated circuits). For example, processor 226 may include an Intel PENTIUM® microprocessor or a Motorola POWER PC® microprocessor. Processor 226 cooperates with memory 228 to perform methods for situational awareness as discussed herein. Processor 226 provides controls and receives status from receiver 222 and transmitter 224. Use of antenna 208 by receiver 222 and transmitter 224 may be coordinated in any conventional manner by processor 226 and/or somewhat independently of processor 226 by each of receiver 222 and transmitter 224.

Memory is used for storing data and program instructions in any suitable manner. A memory device may provide volatile and/or nonvolatile storage using any combination of conventional technology (e.g., semiconductors, magnetics, optics) in fixed and replaceable packaging. For example, memory 228 includes random access storage for working values and persistent storage for program instructions and configuration data. Programs and data may be received by and stored in system 200 in any conventional manner.

An antenna may be coupled to collision avoidance system 202 for use by receiver 222 and/or transmitter 224. For example, antenna 208 may include an assembly mounted outside the fuselage (e.g., attached to the fuselage of the host and coupled to collision avoidance system 202 by one or more cables) on the top and/or the bottom of the fuselage. An antenna assembly mounted on the top of the fuselage may be used in conjunction with or in place of a second antenna assembly on the bottom of the fuselage. The same antenna 208 or an independent antenna 210 may be coupled to locator 204. Antenna 208 and receiver 222 may cooperate for directional reception. For example, antenna 208 may include any conventional directional antenna and/or elements that may be operated for directional reception (e.g., amplitude monopulse or phase monopulse reception).

Figure 1:
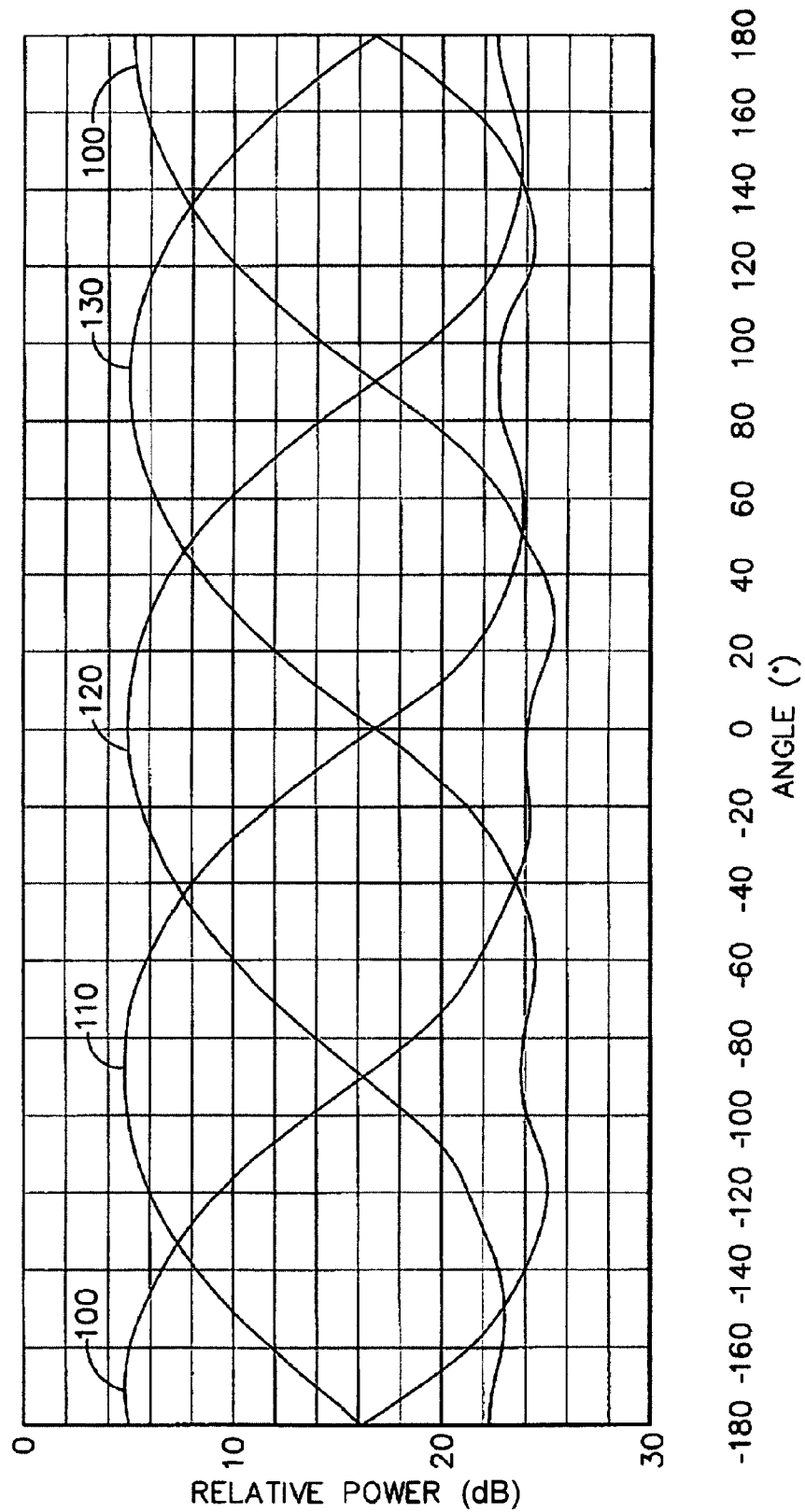
FIG. 1 is a graph of a conventional directional antenna pattern.

As a consequence of the structure and/or operation of antenna 208, a physical direction from which a particular signal is received may be determined by receiver 222 and/or processor 226 (e.g., based on signals from receiver 222, and/or antenna controls from processor 226) (herein called directional reception). For example, antenna 208 may include a four port antenna, each port providing communication substantially with one of four physical quadrants (e.g., as in FIG. 1) of the type disclosed in U.S. Pat. No. 5,191,349 to Dinsmore. Antenna 208 may have one or more elements per port. Antenna 208 may include a mechanically oriented antenna having a directional pattern. Antenna 208 may include elements operated using conventional phased array techniques. Signals received by any such antenna may be analyzed using conventional techniques of directional reception to determine a direction from which the signal is received. Directional reception, as used herein, of a signal conveying serial data (e.g., a series of bits), is conducted without reference to the data (e.g., prior to demodulation of the signal to recover the data). Directional reception techniques may be applied to any signal transmitted by a target. For example, receiver 222 may use directional reception with respect to reply signals from targets not intended for this host.

In cooperation with transmitter 224, receiver 222 may receive signals that indicate range to a target. For example, range to a target may be indicated by a time delay between an interrogation sent by transmitter 224 and a reply received by receiver 222.

Receiver 222 may also receive positional data regarding a target without directional reception techniques being applied to determine target position from the positional data. Positional data may be received from a target or from another system. Examples of positional data not transmitted by the target include signals received from a leader aircraft in a formation that includes the target, signals (e.g., data link) received from another member of a network (e.g., a formation) that includes the host, and signals received from a ground based system. Examples of positional data transmitted by the target include altitude (e.g., as reported in a MODE S reply), latitude, and longitude (e.g., as reported in an ADS-B message). Positional data may be transmitted by a target spontaneously, at the request (e.g., interrogation) of the host, or at the request of another system (e.g., another host or a ground based system). Positional data may be determined by systems aboard the target (e.g., altimeter, inertial navigation system, GPS).

Positional data may include altitude, latitude, and longitude (e.g., absolute coordinates), or relative to another object or vehicle (e.g., relative position of a follower aircraft in a formation). Positional data may include any of several protocols and formats. For example, receiver 222 and/or processor 226 may determine positional data from messages received in any of the following ways: (a) on any conventional data link (e.g., a network among formation members, station keeping equipment); (b) in a conventional air traffic control system MODE S format; (c) in Automatic Dependent Surveillance Broadcast (ADS-B) format, and (d) in a transponder format.

For a message transmitted by a target that includes positional data as discussed above, bearing may be determined (a) using directional reception; and/or (b) from the positional data itself. Note that error in directional reception is generally independent of systems of the target; and error in positional data is generally independent of directional reception techniques.

According to various aspects of the present invention, when a host receives information (e.g., based on directional reception) from which it can calculate bearing to a target based on a model that may be in error; and receives more accurate information (e.g., positional data) from which it can calculate bearing to a similarly situated target not based on the model, then the host may update the model to remove error indicated by the more accurate information. The host may apply a correction to the bearing produced when using the model. The host may apply a correction with or without updating the model. The correction may be dynamically updated to account for additional error in the model that may not have been anticipated at the time the model was prepared. When two sources of information are available regarding the same target (e.g., directional reception and positional data), the amount of error in the model is evident from a comparison. Error in the model may be different at different bearings and/or different elevation angles. Consequently, updating the model and/or applying corrections to the bearing produced when using the model may be accomplished for each suitable combination of bearing and elevation angle. A similarly situated target is a target in a similar position relative to the host (e.g., similar bearing and/or similar elevation angle). In the instance that directional reception describes a target and more accurate information (e.g., positional data) describes the same target, the target and the similarly situated target are identical.

During operation of system 200, and for suitable targets, processor 226 may calculate a corrected bearing to the target relative to the host based on a correction amount. The correction amount may be updated at suitable occasions (e.g., periodically, when a batch of suitable data is available, or when data sufficient for each reliable update is available). The correction amount and the manner in which the correction amount is combined with an uncorrected bearing may use error correction techniques known in other disciplines (e.g., an offset added to an uncorrected term, a factor multiplied or divided with an uncorrected term, a value squared and summed with other squares for an RMS error to be combined with an uncorrected term).

For example, to determine and update a correction amount used as an offset, operation may proceed as follows. Processor 226 and locator 204 cooperate to determine the host's location. Processor 226 and receiver 222 cooperate to determine a first uncorrected bearing based on directional reception. Processor 226 and receiver 222 cooperate to determine a second uncorrected bearing not based on directional reception but rather based on positional data received in any manner. Processor 226 calculates a difference between the first and second uncorrected bearings and stores the difference as an updated correction amount.

A correction amount may be applied to determine a bearing to a similarly situated target (e.g., the same target described by signals already received as discussed above, or a different target having similar uncorrected bearing). First, an uncorrected bearing to the similarly situated target is calculated based on directional reception. The corrected bearing to the similarly situated target is calculated as the sum of the uncorrected bearing and a correction amount.

In effect the accuracy of the corrected bearing of the target is the accuracy of the target's position as determined by the system that prepares the positional data. When a target approaches for which little or no positional data is available (e.g., a target having a transponder without ADS-B capability), processor 226 may calculate a corrected bearing to that target based on directional reception from the target and a correction amount discussed above.

Corrected bearing may be available for the similarly situated target encountered on the same or a future flight of the host. Because correction amounts are stored in the host and available on all subsequent flights, each host accumulates correction amounts suitable to its environment.

Corrected bearing may be provided on annunciator 206. Suitable advisories may be prepared and provided based on corrected bearing. Annunciator 206 may provide the bearing and/or advisories with any conventional numeric and/or graphic display techniques.

Figure 3:
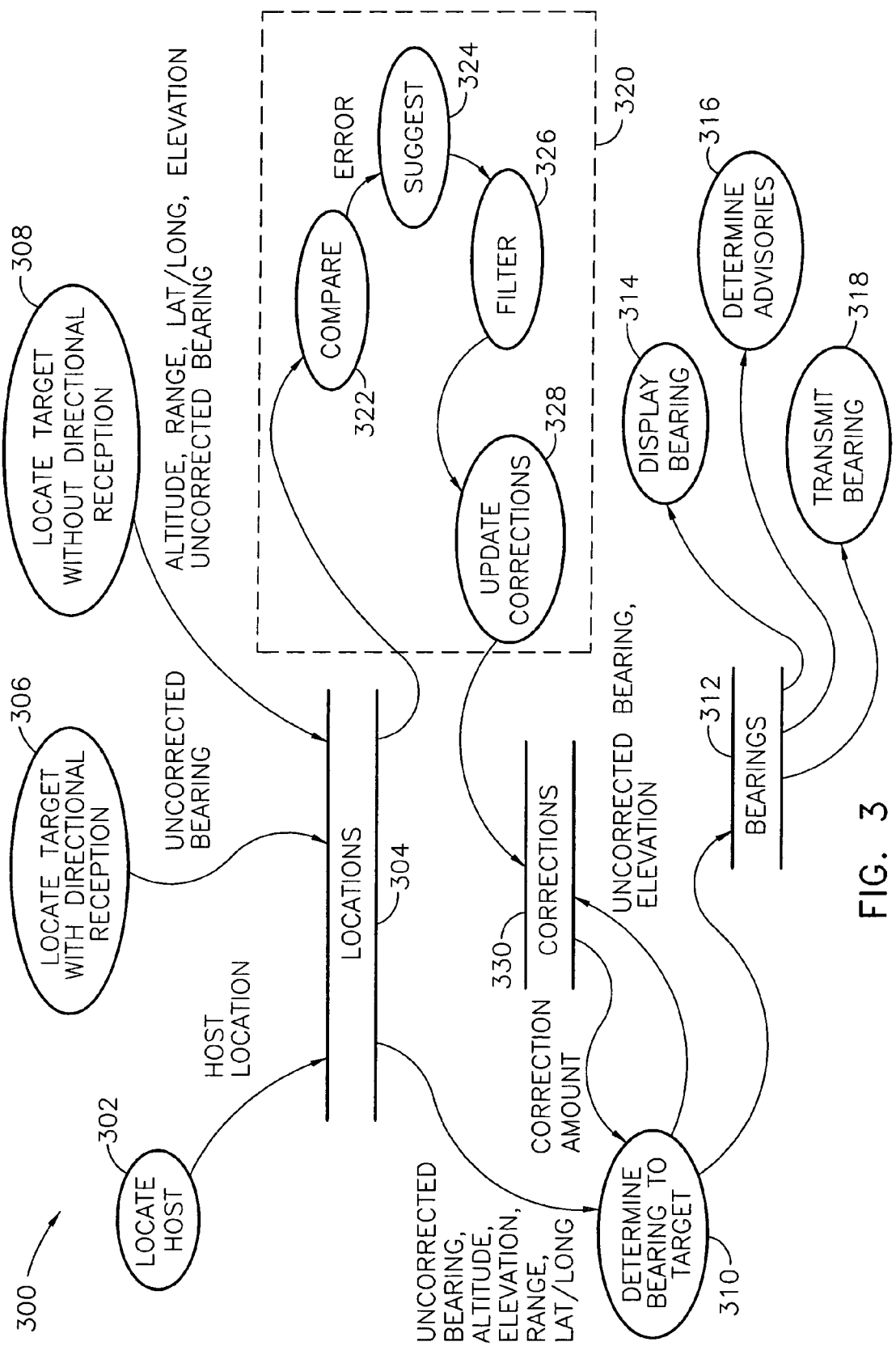
FIG. 3 is a data flow diagram of a method for determining bearing according to various aspects of the present invention.

A method for improved situational awareness, according to various aspects of the present invention, may include a method for correcting bearing to a target as discussed above. Such a method may determine a target location and combine an uncorrected bearing with a correction amount. The correction amount may be subject to dynamic update. For example, method 300 of FIG. 3 includes locate host process 302, locations store 304, locate target using directional reception process 306, locate target without directional reception process 308, determine bearing to target process 310, bearings store 312, display bearing process 314, determine advisories process 316, transmit bearing process 318, determine correction amount process 320, and corrections store 330. Stores 304, 312, and 330 may be implemented in memory 228 and/or a circuit of processor 226. Processes 302, 306, 308, 310, 314, 316, 318, and 320 may be implemented by one or more engines (e.g., special purpose or redundant), each engine comprising any combination of functional blocks discussed above. For example, receiver 222, memory 228 and processor 226 may comprise an engine for one or more processes.

A locate host process determines a location of the host and updates that location at suitable intervals. For example, locate host process 302 receives positional data from locator 204 describing the host. Positional data may include latitude, longitude, and altitude. Positional data may be referred to an absolute frame of reference or be referred to a relative frame of reference (e.g., position within a formation relative to a lead aircraft). Positional data may be associated with a time when the host was at the determined location. Each determined host location may be stored in locations store 304.

A locate target process determines and updates location information for each suitable target. A target may be unsuitable due to a relatively high margin of error associated with the target (e.g., weak or garbled signals received indicating presence of or describing the target). According to various aspects of the present invention, a location for a target is determined from as many sources of information as available. For example, more than one directional reception technique may be used; more than one source of positional data may be used.

A locate target with directional reception process receives signals from antenna 208, applies a conventional directional reception technique (e.g., amplitude monopulse or phase monopulse reception), and provides uncorrected bearing of a target relative to the host. Uncorrected bearing may include conventional compensation for error. For example, process 306 controls receiver 222 to specify a desired sensitivity, cooperates with transmitter 224 to facilitate further reception by receiver 222 of signals for directional reception (e.g., transmits interrogation signals), analyzes amplitudes and/or phases of received signals from each of several ports of antenna 208, and stores the determined uncorrected bearing in locations store 304.

A locate target without directional reception process receives signals from antenna 208, determines positional data using any conventional demodulation and parsing techniques (e.g., decoding a field of a serial binary signal), and provides such positional data describing the target. Positional data may include altitude, range from host to target, latitude, and/or longitude. Range may be determined by interrogation/reply timing as discussed above and is included here because directional reception is not necessary for range determination. For example, process 308 controls receiver 222 to specify a desired sensitivity, cooperates with transmitter 224 to facilitate further reception by receiver 222 of messages (e.g., in reply to interrogations), for each message determines a message format, parses each message according to a suitable format, and stores positional data in locations store 304. For received ADS-B messages, process 308 decodes positional data of the target from one or more suitable message fields (e.g., latitude, longitude, altitude). For received MODE S messages, process 308 decodes altitude. Process 308 may determine elevation of the target relative to the host using a trigonometric formula based on the difference between target and host amplitudes and range to the target. Process 308 may determine an uncorrected bearing from host location and target location (e.g., using latitude and longitude of host and target). Process 308 may determine an uncorrected bearing to a target based on the bearing of the host as reported by the target.

Processes 306 and 308 may update target location determinations at any suitable rates, such as rates related to the type of target (e.g., aircraft, terrain, land vehicle), target's determined time to collision with host, and amount of traffic being tracked. Each determined location may be associated with a description of the respective accuracy (e.g., signal strength, receiver sensitivity, signal to noise ratio), technique (e.g., directional, not directional), and/or data used in the determination. Uncorrected bearing may be described as based on amplitude monopulse technique, phase monopulse technique, or particular message fields as reported by particular sources of information (e.g., a control tower, a satellite, a type of airborne surveillance system). Elevation may be described as based on reported altitude(e.g., one of MODE S reply and ADS-B message) and ranging (e.g., radar slant range). In one implementation indicia of such description is stored in association with each determination (e.g., in the same record). In another implementation, the description may be deduced from a manner in which the determination is stored (e.g., all directional reception based determinations stored apart from all other determinations). Each determination may be associated with a time that the target was located at the determined location. Any conventional technique may be used to correlate information from process 306 and 308 upon a reasonable inference that the products of processes 306 and 308 describe the same target.

As discussed above, it may not be possible or desirable for processes 306 and 308 to provide two or more determinations for a particular target. When at least two determinations are made, at least one from process 308, a correction amount and/or an update to a correction amount may be made as discussed herein.

A determine bearing to target process determines bearing in any conventional manner and applies a correction amount to an uncorrected bearing to provide a corrected bearing of a target relative to the host. For example, a determine bearing process may utilize a conventional look up table as described in U.S. Pat. No. 6,329,947 to Smith. Such a look up table implements part of a model of antenna performance as discussed above. According to various aspects of the present invention, the corrected bearing may be determined in accordance with more than one target location determination; and/or determined in accordance with a correction amount. For example, determine bearing to target process 310 determines and updates a respective bearing for each target having determined locations that are stored in locations store 304. Determined bearings may be stored in bearings store 312. For each target, process 310 may recall from locations store 304 a set of host and target location determinations probably referring to the same target (e.g., relatively close in time, relatively close in location, associated with the same aircraft or flight identifier). Location determinations may be adjusted for motion of the host and/or motion of the target that may have occurred between the times of the determinations. Process 310 may make such adjustments when the direction and velocity of such motion can be deduced from related location determinations in locations store 304. Process 310 may read a correction amount from corrections store 330 and apply it as discussed above to provide a corrected bearing. Correctable values include location determinations, an uncorrected bearing, or a bearing previously compensated for a different source of error. Generally, the correctable value is identifiable as appropriate for a correction (e.g., compensation) technique associated with a correction amount. For example, a location determination or determined bearing that was made based on directional reception may be subject to correction as discussed herein. In particular, a correction as discussed herein may be applied when the relevant signals were received via antenna patterns that may presently be different from a modeled condition (e.g., actual ground plane is not as flat or as uniform as the ground plane assumed when the model was prepared).

Process 310 may determine a target elevation angle of the target relative to the host (e.g., when not determined by process 308). Elevation angle may be determined with reference to host altitude, target altitude, and range from host to target. Elevation angle may be an angular measurement in a plane (e.g., a vertical plane at the measured azimuth). Host altitude may be provided by process 302. Target altitude may be provided by process 306 or 308. These altitudes may be stored in locations store 304. The elevation angle can be determined by taking the difference between the altitudes of the target and the host, determining the distance between the target and the host, and using a trigonometric function (e.g., inverse sine) to calculate the elevation angle. Distance may be determined from the amount of time between an interrogation and a reply.

A bearings store receives corrected bearings and provides bearings for display, advisories, and/or transmitting. Bearings store 312 may include for each target a present value of a corrected bearing received from determine-bearing to target process 310.

A display bearing process provides a signal for controlling a conventional display to present corrected bearing in any conventional manner. For example, display bearing process 314 provides serial data in accordance with ARINC 429 that includes graphic symbols at suitable positions and text (e.g., aircraft flight ID and/or bearing in digits) for presentation on a VSI/TRA display. Process 314 may provide any suitable signals to annunciator 206.

A determine advisories process uses corrected bearing of each target to determine when to provide suitable advisories. Advisories may include traffic advisories and/or resolution advisories in any conventional audio or visual media. For example, determine advisories process 316 includes all conventional functions for TCAS operation using corrected bearing in place of bearing based solely on analysis of signals using directional reception. Process 316 may provide any suitable signals to annunciator 206.

A transmit bearing process operates a transmitter to transmit present values from a bearings store to other systems. For example, process 318 operates transmitter 224 to provide bearings from store 312 in reply to a suitable request or interrogation.

A process for determining and updating corrections may include comparing location information of a target and similarly situated targets, suggesting a correction amount to reduce a variance of the compared location information, filtering suggested values to avoid unsuitable system response, and storing a filtered correction amount as an update (e.g., replacement) of a value that was available for use prior to update. For example, process 320 calculates one or more correction amounts and stores them in corrections store 330. Process 320 includes compare process 322, suggest process 324, filter process 326, and update process 328.

A correction amount may be derived from a significant difference between two or more instances of determined location and/or determined bearing. For example, location store 304 may include one or more location records for similarly situated targets determined with directional reception and one or more location records for similarly situated targets determined with positional data.

A compare process compares similar location information to determine an error amount. For example, compare process 322 determines whether sufficient records exist describing one or more targets in a particular range of uncorrected bearing; and, if so, provides a variance (e.g., a difference) as an error amount. For example, an error may be determined from a difference between uncorrected bearing from process 306 and uncorrected bearing from process 308. One or more moving averages of values from one or more targets may be used. Each error amount may be identified to a range of uncorrected bearing and may further be identified to a range of elevation.

A suggestion process suggests a correction amount based on error amounts received from a compare process. For example, suggestion process 324 may receive one or more error amounts from process 322 identified to a range of uncorrected bearing and a range of elevation. If an error amount exceeds a threshold (e.g., a limit bearing angle error in degrees greater than about 0.8 degrees) or persists (e.g., for a sufficient amount of data, operating time, number of flights), then a change in correction amount may be suggested. The suggestion may comprise a goal amount to be achieved in a planned stepwise update.

As discussed above, a suitable correction amount may be an offset (e.g., applied as a term to sum with uncorrected bearing), a factor (e.g., applied by multiplication or division with uncorrected bearing), or a value to be combined using an RMS technique.

To reduce oscillation of a stored correction amount (e.g., stored in corrections store 330), changes to a stored correction amounts may be subject to hysteresis, limits on how frequently a correction amount is updated, and/or limits on the magnitude of an individual update. All such limits are applied by a filter process. For example, filter process 326 provides intermediate storage of correction amounts suggested by process 324 and may read values from corrections store 330 (e.g., for configuration or initialization). Process 326, at any suitable time, provides a filtered output value according to any conventional digital filtering technique. (e.g., a weighted sum of several suggested correction amounts, a moving average of suggested correction amounts).

An update corrections process may replace one or more correction amounts stored in a corrections store with suitable values from a compare, suggest, and/or filter process. For example, update process 328 receives filtered suggested correction amounts from filter process 326 and stores them in corrections store 330. Updates may be made at any suitable time, for example, on availability of a new filtered result, at the end of a flight, when joining a formation, and/or at regular intervals (e.g., every 10 minutes).

A corrections store may store a plurality of correction amounts organized for efficient access in any conventional manner. In one implementation, each correction amount is for correction of bearing where the uncorrected bearing is based at least in part on signals received using an antenna having patterns that may presently be different from a modeled condition of the antenna. As such, correction amounts may be understood to be a correction or extension of the model. For example, corrections store 330 may include an array as described in Table 1.

In Table 1, each correction amount is associated with a middle value of a range of uncorrected bearing (e.g., range 30 to 49.9 indicated as 40) and a middle value of a range of uncorrected elevation angle (e.g., range −7.5 to −2.49 indicated as −5). Each correction amount in Table 1 is a value in degrees used as a term to sum with an uncorrected bearing to provide a corrected bearing.

Storage of the data shown in Table 1 may be implemented in any conventional manner (e.g., array, linked list, tree, graph). Access may be by linear search along axes ranges to find a suitable range corresponding to the uncorrected bearing and elevation. In another implementation, correction amounts are arranged in a binary tree to facilitate a binary tree search algorithm. In another implementation, instructions for determining a suitable correction amount are combined with instructions for applying the correction (e.g., nested if-then-else for different correction techniques on different ranges of uncorrected data). Interpolation may be used to obtain a correction amount more closely corresponding to the uncorrected bearing and/or elevation.

Table 1 represents exemplary correction amounts after updates. Table 1 is subject to further updates as the host encounters targets in different bearing and elevation angles. For instance, correction amounts of Table 1 may be set to zero initially or following a configuration change of the host. Initialization as discussed above may be omitted when sufficient dynamic updates are expected to occur in a suitable time. In another implementation of corrections store 330, one or more different formats are used for a correction amount (e.g., integer value, floating point value, or a set of values for complex correction techniques). The granularity and/or linearity of correction amounts in store 330 may be nonuniform. For example, offset values may be stored for every 10 degrees in bearing angle and for every 2 degrees in elevation angle. The range of elevation angles for which correction amounts are provided may be increased or decreased.

TABLE 1

| Uncorrected Bearing Angle (degrees) | Elevation Angle (degrees) | | | | | | |
|---|---|---|---|---|---|---|---|
| | −10 | −5 | 0 | 5 | 10 | 15 | 20 |
| −160 | 3 | 4 | 3 | 2 | 1 | 2 | 2 |
| −140 | 2 | 3 | 2 | 1 | 0 | 1 | 1 |
| −120 | 1 | 2 | 1 | 0 | −1 | 0 | 0 |
| −100 | 0 | 1 | 0 | −1 | −2 | −1 | −1 |
| −80 | −1 | 0 | −1 | −2 | −3 | −2 | −2 |
| −60 | −2 | −1 | −2 | −3 | −4 | −3 | −3 |
| −40 | −2 | −1 | −2 | −3 | −4 | −3 | −3 |
| −20 | −1 | 0 | −1 | −2 | −3 | −2 | −2 |
| 0 | −1 | 0 | −1 | −2 | −3 | −2 | −2 |
| 20 | 0 | 1 | 0 | −1 | −2 | −1 | −1 |
| 40 | −1 | 0 | −1 | −2 | −3 | −2 | −2 |
| 60 | −1 | 0 | −1 | −2 | −3 | −2 | −2 |
| 80 | −2 | −1 | −2 | −3 | −4 | −3 | −3 |
| 100 | −1 | 0 | −1 | −2 | −3 | −2 | −2 |
| 120 | 0 | 1 | 0 | −1 | −2 | −1 | −1 |
| 140 | 1 | 2 | 1 | 0 | −1 | 0 | 0 |
| 160 | 1 | 2 | 1 | 0 | −1 | 0 | 0 |
| 180 | 2 | 3 | 2 | 1 | 0 | 1 | 1 |

Table 1 represents a set of correction amounts that may be used for deriving an error function in any conventional manner. In another implementation, a piecewise linear approximation of the error function is used. In other words, linear interpolation is used between member values of the set.

Correction amounts in Table 1 accommodate installations where symmetry does not exist perfectly. For example, a fuselage may not be flat at a position where antenna 208 is to be installed. It may not be feasible to mount an antenna at the center of a structure to provide symmetry. If antenna 208 is mounted for symmetric communication patterns, another structure (e.g., another antenna) nearby may not affect these patterns symmetrically.

Processes of method 300 may be performed periodically and/or whenever sufficient data for a process is available. In other words, system 200 may employ multiple instances of the method 300 and/or its processes in a conventional time sharing scheme for substantially simultaneous processing for a plurality of targets.

In another implementation according to various aspects of the present invention, determination of elevation angle is omitted. A corrected bearing is determined without reference to the elevation angle (or altitude) of the target. Commensurate simplifications are made to processes 302, 306, 308, 310, and 326; and to stores 304 and 330.

The source of more accurate position information describing a target may be the target as discussed above. In another implementation position information is received from a station (e.g., a control vehicle, or a ground station) that has knowledge of the position of the target and is in communication with the host.

Accordingly, embodiments of the invention may dynamically and automatically correct for bearing errors, for example, as caused by aircraft fuselage curvature, reflections from aircraft obstructions, variation in elevation angle, manufacturing tolerances, changes in the installation and configuration of equipment of the host, and changes attributable to aging, wear, and tear.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A method for determining corrected bearings, the method comprising: a step for determining a first uncorrected bearing in accordance with signals received using directional reception; a step for calculating a correction amount in accordance with the first uncorrected bearing and received positional data; and a step for applying the correction amount to subsequently determined uncorrected bearings to provide the corrected bearings.

2. A system for determining corrected bearings, the system comprising: means for determining a first uncorrected bearing in accordance with signals received using directional reception; means for calculating a correction amount in accordance with the first uncorrected bearing and received positional data; and means for applying the correction amount to subsequently determined uncorrected bearings to provide the corrected bearings.

3. A method for situational awareness performed by a system aboard a host vehicle, the method comprising in sequence: a step for determining a first uncorrected bearing in accordance with a first signal and a direction, the first signal associated with a first target relative to the host vehicle, the first signal in further accordance with directional reception from the direction; a step for determining a correct-bearing in accordance with received positional data, the data being in accordance with the direction; a step for determining a correction amount in accordance with the first uncorrected bearing and the correct bearing; a step for determining a second uncorrected bearing in accordance with a second signal, the second signal associated with a second target relative to the host vehicle, the second signal in further accordance with directional reception from the direction; and a step for determining a corrected bearing in accordance with the second uncorrected bearing, the correction amount, and the direction.

4. The method of claim 3 wherein: the method further comprises a step for storing the correction amount in accordance with the direction; and the step for determining a corrected bearing comprises a step for recalling the correction amount in accordance with the direction.

5. The method of claim 3 wherein the positional data is received from the first target.

6. The method of claim 3 wherein the positional data comprises an ADS-B format.

7. The method of claim 4 wherein recalling the correction amount comprises a step for performing a binary tree search algorithm.

8. The method of claim 3 wherein the method further comprises a step for using the corrected bearing for at least one of traffic alerting and collision avoidance.

9. The method of claim 3 further comprising a step for providing, in accordance with the corrected bearing, a signal for a display.

10. The method of claim 3 wherein the step for determining a correction amount comprises a step for determining an average of a plurality of stored first uncorrected bearings.

11. The method of claim 3 wherein the step for determining the corrected bearing comprises a step for combining the second uncorrected bearing and the correction amount.

12. The method of claim 11 wherein the step for combining comprises a step for computing a sum that includes the correction amount.

13. The method of claim 11 wherein the step for combining comprises a step for computing at least one of a product that includes the correction amount and a quotient that includes the correction amount.

14. The method of claim 3 wherein the host and a second aircraft are members of a formation and the positional data is received from the second aircraft.

15. A method for situational awareness performed by a system aboard a host vehicle, the method comprising: a step for determining a first uncorrected bearing in accordance with a first signal and a direction, the first signal associated with a first target relative to the host vehicle, the first signal in further accordance with directional reception from the direction; a step for determining a first elevation of the first target relative to the host vehicle; a step for determining a correct bearing in accordance with received positional data, the data being in accordance with the direction and the first elevation; a step for determining a correction amount in accordance with the first uncorrected bearing and the correct bearing; a step for determining a second uncorrected bearing in accordance with a second signal, the second signal associated with a second target relative to the host vehicle, the second signal in further accordance with directional reception from the direction; a step for determining a second elevation of the second target; and a step for determining a corrected bearing in accordance with the second uncorrected bearing, the correction amount, the direction, and the second elevation.

16. The method of claim 15 wherein: the method further comprises a step for storing the correction amount in accordance with the direction and the first elevation; and the step for determining a corrected bearing comprises a step for recalling the correction amount in accordance with the direction and the second elevation.

17. The method of claim 15 wherein the positional data is received from the first target.

18. The method of claim 15 wherein the positional data comprises an ADS-B format.

19. The method of claim 16 wherein the step for recalling the correction amount comprises a step for performing a binary tree search algorithm.

20. The method of claim 15 wherein the method further comprises a step for using the corrected bearing for at least one of traffic alerting and collision avoidance.

21. The method of claim 15 further comprising a step for providing, in accordance with the corrected bearing, a signal for a display.

22. The method of claim 15 wherein the step for determining a correction amount comprises a step for determining an average of a plurality of stored first uncorrected bearings.

23. The method of claim 15 wherein the step for determining the corrected bearing comprises a step for combining the second uncorrected bearing and the correction amount.

24. The method of claim 23 wherein the step for combining comprises a step for calculating a sum that includes the correction amount.

25. The method of claim 23 wherein the step for combining comprises a step for computing at least one of a product that includes the correction amount and a quotient that includes the correction amount.

26. The method of claim 15 wherein the host and a second aircraft are members of a formation and the positional data is received from the second aircraft.

27. A memory device comprising instructions for performing the method of any of claims 3 through 26.

28. A system for situational awareness, the system comprising: a receiver that provides the first signal and the second signal; a processor coupled to the receiver; and a memory device, coupled to the processor, comprising instructions for the processor to perform the method of any of claims 3 through 26.

* * * * *